US007696898B2

(12) United States Patent
Funaki

(10) Patent No.: US 7,696,898 B2
(45) Date of Patent: Apr. 13, 2010

(54) ELECTRONIC INSTRUMENT

(75) Inventor: Noriharu Funaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 979 days.

(21) Appl. No.: 11/449,094

(22) Filed: Jun. 8, 2006

(65) Prior Publication Data

US 2007/0008170 A1 Jan. 11, 2007

(30) Foreign Application Priority Data

Jul. 6, 2005 (JP) ............................ 2005-197423

(51) Int. Cl.
*G05B 19/02* (2006.01)
*G08C 19/00* (2006.01)

(52) U.S. Cl. ............................ 340/825.22; 340/825.69; 340/825.72; 398/112; 348/734

(58) Field of Classification Search ............ 340/825.69, 340/825.72, 825.22; 398/112; 348/734
See application file for complete search history.

(56) References Cited

U.S. PATENT DOCUMENTS 4,807,052 A * 2/1989 Amano ........................ 348/734
5,745,068 A * 4/1998 Takahashi et al. ............ 341/176
2005/0078226 A1* 4/2005 Matoba ...................... 348/734

FOREIGN PATENT DOCUMENTS

JP 01-246993 10/1989
JP 02-020198 1/1990
JP 03-177192 8/1991
JP 9-070076 3/1997
JP 07-10091 B 5/1998
JP 2002-300420 A 10/2002

OTHER PUBLICATIONS

Translation of Japanese Application No. 63-075459 (Pub. No. 01-246993) Shibao Masami et al., (Feb. 10, 1989). PTO 09-7742.*
Translation of Japanese Application No. 63-170181 (Pub. No. 02-020198) Shibuya Takashi (Jan. 1, 1990). PTO 09-7744.*

* cited by examiner

*Primary Examiner*—Brian A Zimmerman
*Assistant Examiner*—Nam V Nguyen
(74) *Attorney, Agent, or Firm*—AdvantEdge Law Group, LLC

(57) ABSTRACT

An electronic instrument for which operating setting is possible according to operating signals transmitted from a plurality of kinds of remote operating devices of a differing operating signal structure, includes: an operating signal receiving section which receives the operating signals transmitted by the remote operating devices; an operating signal processing section which, when a specified operating signal based on a specified operating signal structure is input among the operating signals received by the operating signal receiving section, carries out a process control of the electronic instrument in accordance with the specified operating signal; and an operating signal conversion section which, being provided in a branch signal transmission system which diverges from a direct signal system, which directly transmits the operating signal from the operating signal receiving section to the operating signal processing section, converts an operating signal based on an operating signal structure which differs from the specified operating signal into the specified operating signal, wherein the operating signal conversion section transmits the converted operating signal to the operating signal processing section, whereon the operating signal processing section carries out an operating process in the electronic instrument based on the converted operating signal.

4 Claims, 6 Drawing Sheets

SELECTION TABLE

| IDENTIFICATION CODE | CONVERSION TABLE |
|---|---|
| 010 | TABLE 1 |
| 011 | TABLE 2 |
| 012 | TABLE 3 |
| ... | ... |

CONVERSION TABLE: TABLE 1

| OPERATION | RECEIVED OPERATING SIGNAL | SPECIFIED OPERATING SIGNAL |
|---|---|---|
| MOVE UP | 0101 | 0001 |
| MOVE DOWN | 0110 | 0010 |
| MOVE LEFT | 0111 | 0011 |
| MOVE RIGHT | 1000 | 0100 |
| 1 | 1001 | 0101 |
| 2 | 1011 | 0110 |
| 3 | 1010 | 0111 |
| ... | ... | ... |

ELECTRONIC INSTRUMENT

BACKGROUND

1. Technical Field

The present invention relates to an electronic instrument for which operating setting is possible according to operating signals transmitted from a plurality of kinds of remote operating devices of a differing operating signal structure, wherein, for example, it can be employed in an AV (Audio Visual) instrument which can be operated by a remote controller.

2. Related Art

In recent years, in a general household, apart from a television, a video deck and a DVD (Digital Versatile Disk), an HD (Hard Disk) recording instrument and the like have become widely commonplace, wherein it has become possible for a viewer to record a television program on these recording instruments while it is on air, and watch the recorded program at a desired time.

A remote controller or the like is appended, as a remote operating device, to this kind of television and recording instrument, whereby it is possible to remotely operate the instruments from a distant place.

However, as an operating signal transmitted from each remote controller is based on a distinct operating signal structure for each company manufacturing an instrument, and for each type of instrument, a problem exists wherein an operator has to operate a separate remote controller for each instrument, meaning that the operation is troublesome.

For this reason, a technology has been proposed wherein a function is provided in the electronic instrument side which learns the operating signal structure of the operating signal transmitted from the remote controller, thereby enabling operation by a plurality of kinds of remote controller (for example, refer to Patent Document 1: JP-B-7-10091).

Also, a technology has been proposed wherein firstly a selection is made form a menu on a television screen, thereby setting the remote controllers which can be used (for example, refer to Patent Document 2: JP-A-2002-300420).

However, regarding the technology in Patent Document 1, as a learning function is included in a controller which actually carries out an operating setting process in an electronic instrument, based on an operating signal transmitted from a remote controller, a problem exists wherein the processing inside the controller becomes complicated, necessitating an installing of a high-performance controller in the electronic instrument, making it difficult to achieve a reduction in manufacturing cost.

Also, regarding the technology in Patent Document 2, a problem exists wherein, in the event that a remote controller other than a remote controller appended to a television is used, as it is necessary to start up the television and look at a screen while carrying out a setting, the setting operation becomes troublesome.

SUMMARY

An advantage of some aspects of the invention, regarding a realization of an electronic instrument for which an operation is possible by a plurality of kinds of remote operating devices of a differing operating signal structure, is to provide an electronic instrument which can achieve a simplification of the setting operation for the remote operating devices used, without complicating a part which processes operating signals from the remote operating devices.

According to an aspect of the invention, an electronic instrument for which operating setting is possible according to operating signals transmitted from a plurality of kinds of remote operating devices of a differing operating signal structure, comprises: an operating signal receiving section, an operating signal processing section, and an operating signal conversion section. The operating signal receiving section receives the operating signals transmitted by the remote operating devices. The operating signal processing section, when a specified operating signal based on a specified operating signal structure is input among the operating signals received by the operating signal receiving section, carries out a process control of the electronic instrument in accordance with the specified operating signal. The operating signal conversion section, being provided in a branch signal transmission system which diverges from a direct signal system, which directly transmits the operating signal from the operating signal receiving section to the operating signal processing section, converts an operating signal based on an operating signal structure which differs from the specified operating signal into the specified operating signal. In the electronic instrument, the operating signal conversion section transmits the converted operating signal to the operating signal processing section, whereon the operating signal processing section carries out an operating process in the electronic instrument based on the converted operating signal.

As used herein, the specified operating signal refers to, for example, an operating signal, transmitted from a remote operating device such as a remote controller appended to an electronic instrument, based on an operating signal structure designated to the electronic instrument.

According to the aspect of the invention, the operating signal conversion section is provided separate to the operating signal processing section, whereby all the operating signals based on different operating signal structures are converted into specified operating signals by the operating signal conversion section. Therefore, there is no complication of the processing in the operating signal processing section, or any need to provide a high-performance controller in the electronic instrument, making it possible to achieve a reduction in manufacturing cost.

Also, according to this kind of configuration, even in a case in which the operating signal processing section is not operating, for example, when the electronic instrument is operating in a standby mode etc., as it is possible to set in such a way that remote controllers of a different kind can be used for the electronic instrument, there is no complication of the setting operation.

According to another aspect of the invention, it is preferable that the electronic instrument includes: a conversion information storage section, a conversion setting alert section, and an operating signal structure selection section. The conversion information storage section stores identification information concerning a pre-set plurality of kinds of operating signal structures, and a specified operating signal according to an operating signal based on each of the operating signal structures. The conversion setting alert section which, when a prescribed, specified operating signal is input among the specified operating signals, alerts to the fact that a conversion setting of an operating signal based on another operating signal structure is possible. The operating signal structure selection section, in the event that identification information based on the specified operating signal is received by the operating signal receiving section, selects an operating signal structure corresponding to the identification information received from among the operating signal structures stored in the conversion information storage section.

According to the aspect of the invention, by preparing in advance a specified operating signal in accordance with operating signals of differing operating signal structures, it is possible to realize conversion by the operating signal conversion section by a simple process. Therefore, there is no need to employ an article of an unnecessarily high performance as an element of the microcomputer etc. which configure the operating signal conversion section, thus contributing further to a reduction in manufacturing cost.

Also, as the conversion setting alert section is provided, it is possible for the operator to recognize that the conversion setting has become possible on the electronic instrument side whereby, as it is possible to carry out a use setting for another remote controller simply by operating a remote controller which is capable of transmitting the specified operating signal and transmitting the identification information, it is also possible to simplify the conversion setting operation.

According to a further aspect of the invention, it is preferable that the conversion setting alert section, when the conversion setting becomes possible, illuminates a light emitting body provided in the electronic instrument, and causes the light emitting body to flash when the selection operation is complete.

In this case, it is possible to employ a light emitting element, such as, for example, an LED (Light Emitting Diode), as the light emitting body.

According to the aspect of the invention, as it is possible, by an on/off condition of the light emitting body, to inform the operator whether the conversion setting is possible or complete, even when the electronic instrument is in standby mode etc., it is possible to reliably make the operator aware, and cause him or her to carry out the conversion setting.

According to a still further aspect of the invention, it is preferable that the electronic instrument includes: a transmission system switching section and a switch control section. The transmission system switching section switches an input of an operating signal from the direct signal transmission system or the branch signal transmission system to the operating signal processing section. The switch control section, when the conversion of the operating signal is carried out by the operating signal conversion section, switches the transmission system switching section to the branch signal transmission system.

According to the aspect of the invention, as it is equipped with the transmission system switching section and the switch control section, when the operating signal is converted by the operating signal conversion section, as the converted operating signal is always input into the operating signal processing section, it is possible to reliably realize an operation by another remote controller.

Also, even in the event that an operation setting by another remote controller is carried out, as an operation by a remote controller which transmits the specified operating signal also becomes possible, the benefit to the operator is further increased.

BRIEF DESCRIPTION OF THE DRAWINGS

The invention will be described with reference to the accompanying drawings, wherein like number reference like elements.

DESCRIPTION OF EXEMPLARY EMBODIMENTS

An embodiment of the invention will hereafter be described with reference to the drawings.

1. Configuration of Projector 1

Figure 1:
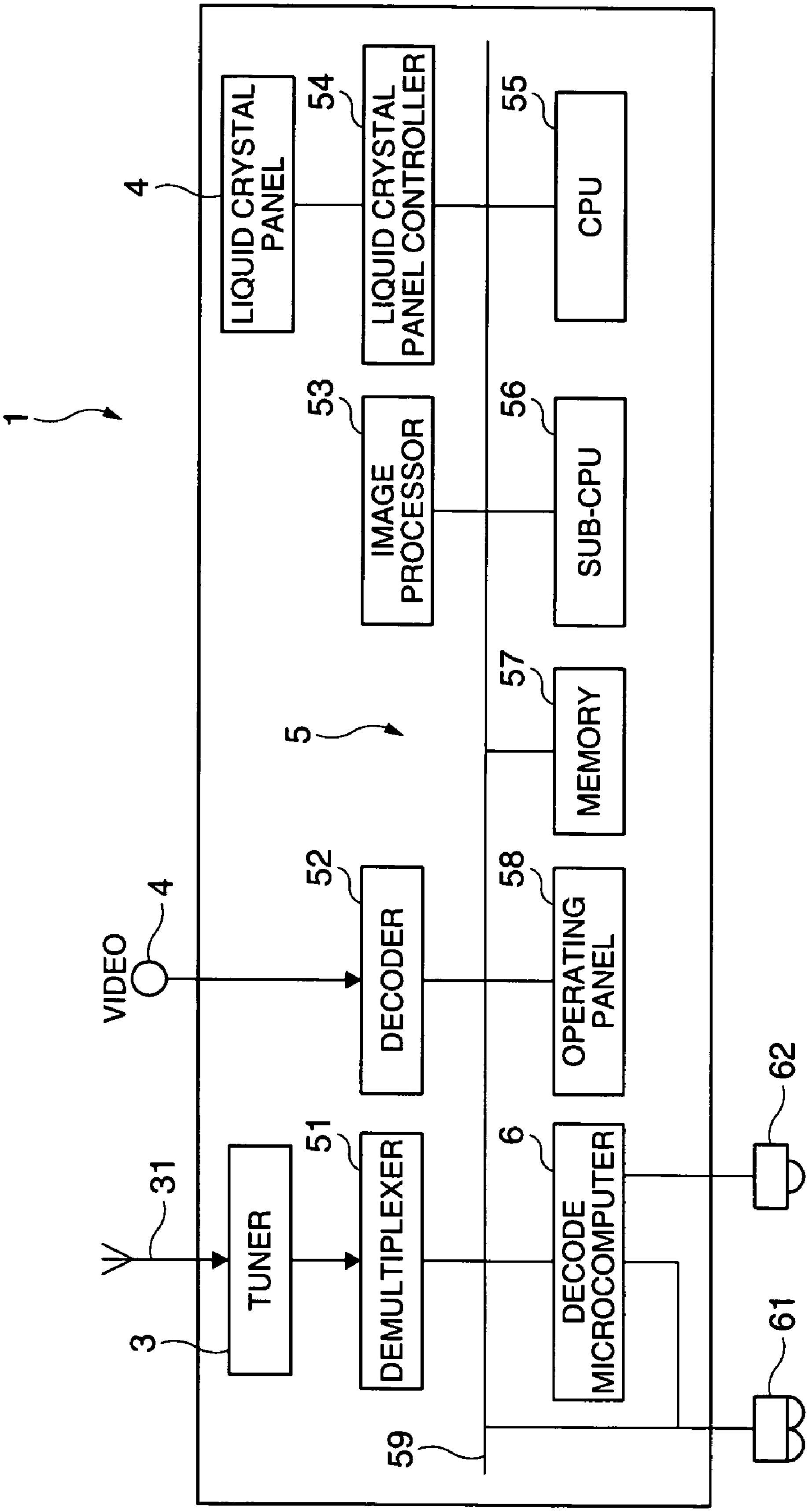
FIG. 1 is a block diagram representing a configuration of an electronic instrument according to an embodiment of the invention.

FIG. 1 shows a projector 1 as an electronic instrument according to the embodiment of the invention. The projector 1 is configured as a rear projector which receives a television broadcast wave and displays a received image on a projection screen. The projector 1 is configured in such a way that a luminous flux emitted from a not-shown light source device is optically modulated by a liquid crystal panel 2 and is projected in an enlarged form on the projection screen. The projector 1 is equipped with a tuner 3, an input terminal 4 and a control board 5.

The liquid crystal panel 2, comprising a liquid crystal enclosed between a pair of transparent substrata disposed opposite each other, applies a drive signal to a switching element such as a TFT (Thin Film Transistor) or a TFD (Thin Film Diode) formed for each pixel on either one of the substrata, by which means an orientation of the liquid crystal for each pixel is changed, thereby optically modulating the incident luminous flux.

The tuner 3 is a part which selectively receives electric waves of a channel selected from among the television broadcast waves received by an antenna 31, converts them into a signal of a certain frequency referred to as an intermediate frequency, and transmits the signal.

The input terminal 4 is a part to which an image transmission instrument such as a video deck is connected wherein, although only a composite signal input terminal is shown as an example in FIG. 1, apart from this, terminals of differing signal formats, such as an RGB signal input terminal and a component signal input terminal, are also provided.

The control board 5, being a part which carries out a drive control and an image processing for the whole of the projector 1, including the liquid crystal panel 2, comprises a demultiplexer 51, a decoder 52, an image processor 53, a liquid crystal panel controller 54, a CPU 55, a sub-CPU 56, a memory 57, an operating panel 58 and a decode microcomputer 6, which are connected via a bus line 59.

The demultiplexer 51 is a part which divides the signal transmitted by the tuner 3 into a picture signal and an audio signal, wherein the divided picture signal is transmitted to the image processor 53, and the audio signal is transmitted to an audio processor, not shown in FIG. 1.

The decoder 52 is a part which divides the composite signal transmitted by the input terminal 4 into a luminance signal and a color-difference signal, wherein the divided luminance signal and color-difference signal are transmitted to the image processor 53. Although in the case of the composite signal it is necessary to carry out a division process in the decoder 52, in the case of the picture signal which is divided into the luminance signal and color-difference signal from the outset, like separate signals, there is no need to carry out this kind of process.

The image processor 53, being a part which carries out an image processing of the picture signals transmitted by the tuner 3 and the decoder 52, accumulates the picture signals input as serial data in a frame buffer, not shown, and generates the image signal for each frame rate. A γ correction based on an individual difference of the liquid crystal panel 2, a resizing and the like are also carried out in the image processor 53. The corrected image signal is transmitted to the liquid crystal panel controller 54.

The liquid crystal panel controller 54 generates a drive control signal for the liquid crystal panel 2, based on the image signal transmitted from the image processor 53, thereby drive controlling each pixel in the liquid crystal panel 2. By driving the liquid crystal panel 2 in accordance with this kind of corrected image signal, it is possible to reproduce an optical image appropriate to the image signal received.

The CPU 55 is a part which controls the whole of the projector 1, wherein operating signals from the operating panel 58 and a remote controller, to be described hereafter, are received by the CPU 55, and processed. The CPU 55 generates a control signal in accordance with the contents of the operating signal received, thus setting the channel selection by the tuner 3, a switching of the input terminals 4, a picture quality, a volume and the like.

The sub-CPU 56 is a part which, when the projector 1 is in a standby condition, that is, in a condition in which no image is being displayed, causes the CPU 55 to operate by carrying out a start-up process, based on start-up operating signals from the operating panel 58 and the remote controller. A specific operating process of the CPU 55 and the sub-CPU 56 will be described in detail hereafter.

Condition setting information for the projector 1 start-up time, and various control programs to be operated on the projector 1, are stored in the memory 57 wherein, when the projector 1 is started up by the sub-CPU 56, the stored control programs and condition setting information are called onto the CPU 55, and a setting of a display image is carried out.

The operating panel 58, being integrally provided in the projector 1, comprises various operating switches such as a start operation button, a volume button and a channel selection button wherein, in the event that there is no remote controller, an operator can operate the projector 1 by depressing the operating switches on the operating panel 58. A power supply master switch, which interrupts all of a power supply to the projector 1, is also provided on the operating panel 58.

The decode microcomputer 6 is a part which, when receiving an operating signal from a remote controller other than the remote controller appended to the projector 1, converts the operating signal received from the appended remote controller to a specified operating signal, the decode microcomputer 6 being connected to an IR receiver 61 and an LED 62. The LED 62 is a light emitting element which, when using another function of the projector 1 such as a capture function, displays an on/off condition of that function in an illuminated form.

Hereafter, a description will be given, with reference to FIGS. 2 and 3, of a functional configuration according to an aspect of the invention expanded to the decode microcomputer 6, the CPU 55, the sub-CPU 56 and the memory 57.

2. Configuration of Functional Section of Decode Microcomputer 6.

Figure 2:
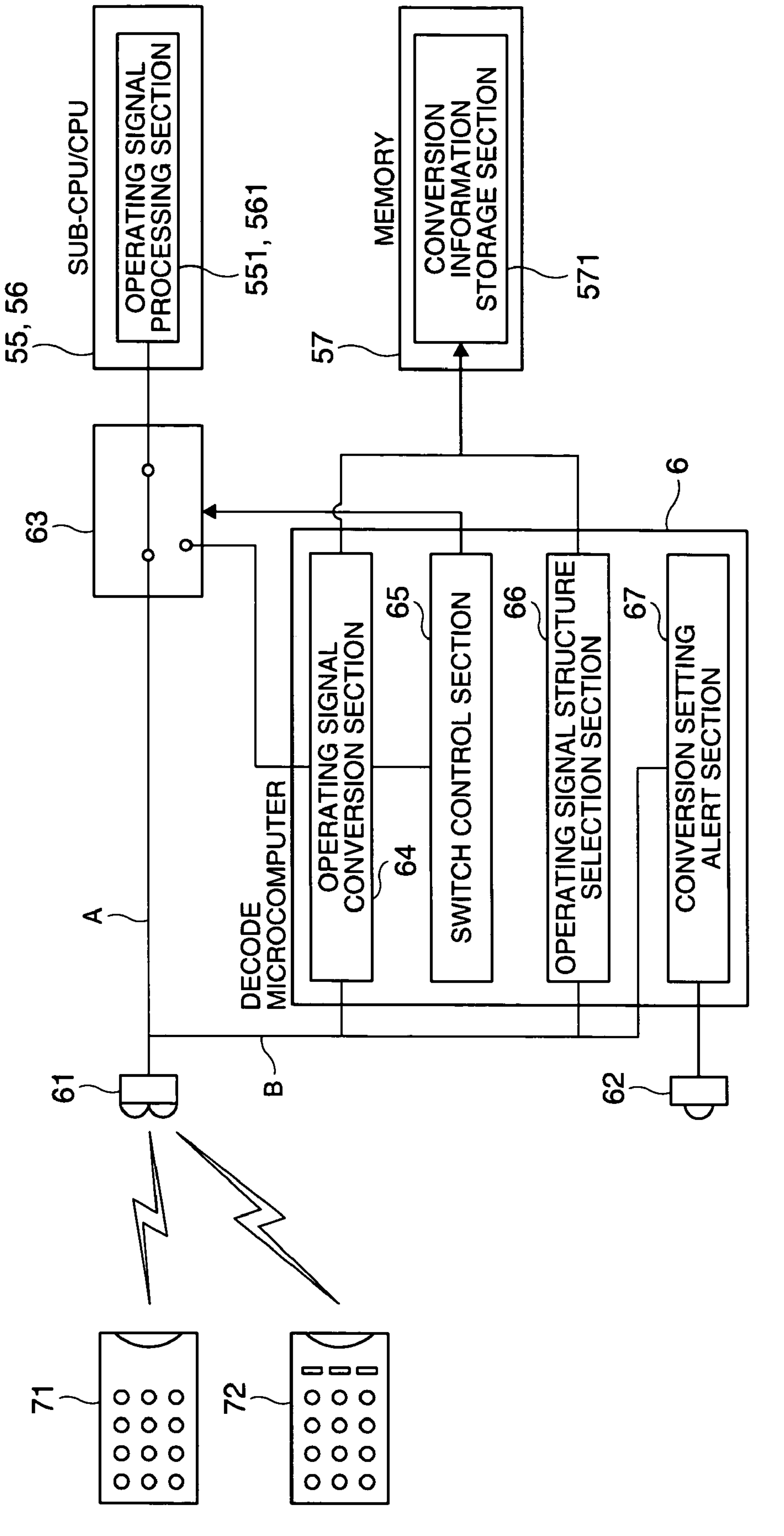
FIG. 2 is a functional block diagram representing a configuration of a functional section in the embodiment.

As shown in FIG. 2, a signal transmission from the IR receiver 61 to the CPU 55 or sub-CPU 56 is carried out through a direct signal transmission system A or a branch signal transmission system B, wherein it is possible to choose through which transmission system the signal is to be transmitted via a switch 63, which is provided at a stage previous to the CPU 55 or sub-CPU 56. Although not shown, an operating signal comprising a combination of pulse wavelengths received by the IR receiver 61 is converted, by an A/D converter provided at a stage after the IR receiver 61, into a digital signal string comprising a combination of "0, 1", and transmitted to the direct signal transmission system A or the branch signal transmission system B.

The IR receiver 61, being a part which receives an operating signal from remote controllers 71 and 72, which act as remote operating devices, receives the specified operating signal, which is the operating signal transmitted from the remote controller 71 appended to the projector 1, and the operating signal transmitted from the remote controller 72, of a differing operating signal structure, which is appended to another electronic instrument and the like.

The CPU 55 and the sub-CPU 56 are equipped respectively with operating signal processing sections 551 and 561. Each of the operating signal processing sections 551 and 561 generates a control signal in accordance with an operating signal transmitted from the IR receiver 61, thereby carrying out operating control of each part of the projector 1. The operating signal processing section 551 of the CPU 55 processes the operating signals while the projector 1 is in operation and generates the control signals, while the operating signal processing section 561 of the sub-CPU 56 processes the operating signals while the projector 1 is in the standby condition and generates the control signals.

The decode microcomputer 6, being provided partway through the branch signal transmission system B, is a part which converts an operating signal, transmitted by the remote controller 72 of another electronic instrument, into the specified operating signal which can be identified by the CPU 55 and the sub-CPU 56 and transmits it, and comprises an operating signal conversion section 64, a switch control section 65, an operating signal structure selection section 66 and a conversion setting alert section 67.

The operating signal conversion section 64 is a part which converts the operating signals transmitted by the remote controller 72, which has a different operating signal structure, into the specified operating signal in accordance with the operating signal structure of the remote controller 71 appended to the projector 1.

As the operating signals transmitted by each of the remote controllers 71 and 72 differ in signal length, pulse width etc. for each operating command, these are independently set according to a manufacturer of the electronic instrument, a machine model etc., wherein the operating signal conversion section 64 converts the operating signals based on this kind of various operating signal structures into the specified operating signal in accordance with the operating signal structure of the appended remote controller 71.

The switch control section 65 is a part which carries out switch control of the switch 63 wherein, to be specific, with the conversion, by the operating signal conversion section 64, of the operating signal received by the IR receiver 61 into the specified operating signal acting as a trigger, the switch 63 is switch controlled to the side on which the branch signal transmission system B short circuits, while in other cases, the switch 63 is switched to the side on which the direct signal transmission system A short circuits.

The operating signal structure selection section 66 is a part which promotes a selection of which operating signal structure, among the various remote controller operating signals received by the IR receiver 61, the conversion of the operating signal into the specified operating signal is to be based on and, based on a selection result, selects the operating signal structure of the remote controller 72 of another electronic instrument to be newly used.

When the remote controller 72 of the another electronic instrument to be newly used is recorded, the recording of the remote controller 72 is realized based on information stored in a conversion information storage section 571 which is provided in the memory 57.

Figure 3:
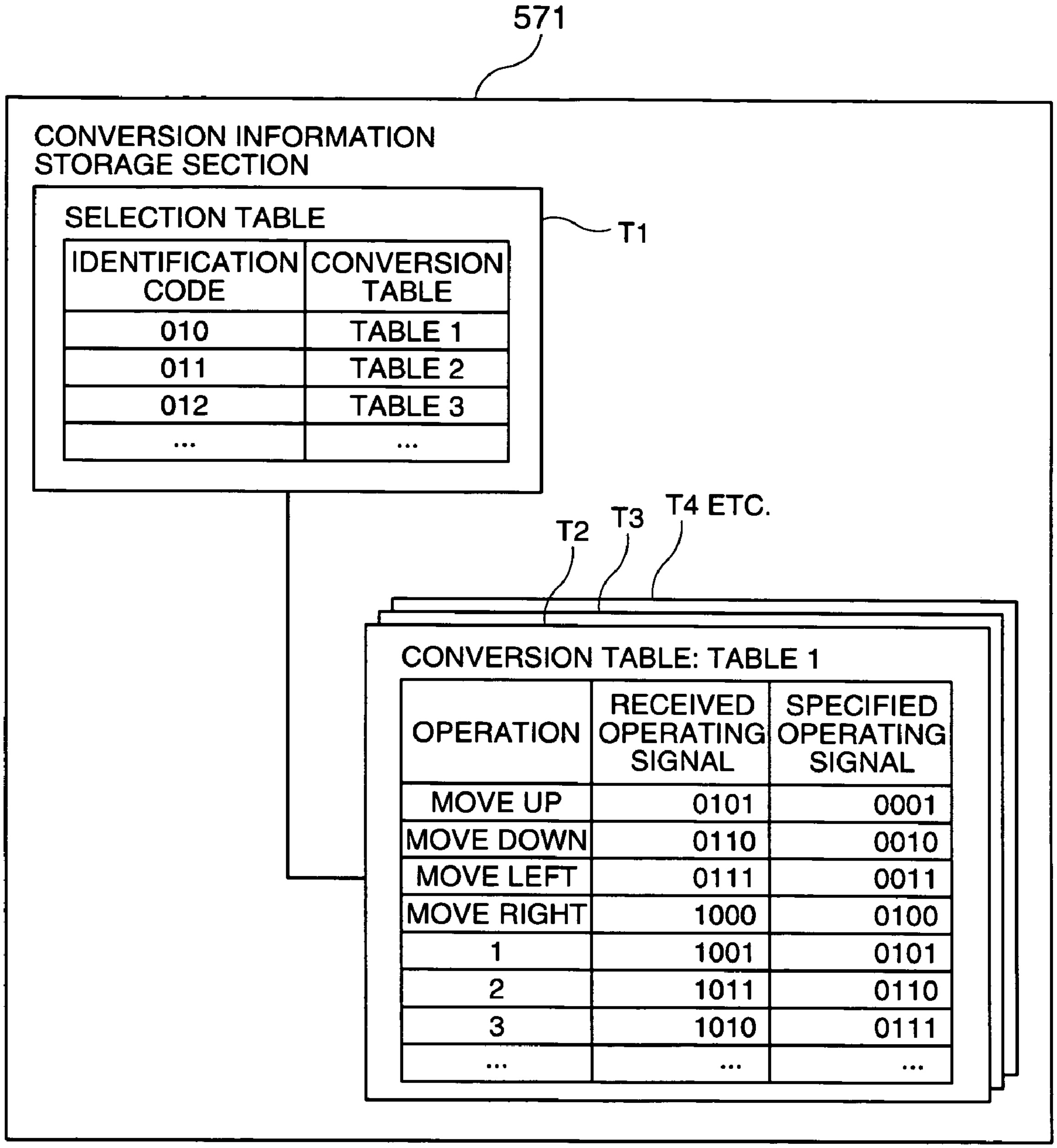
FIG. 3 is a schematic diagram representing a configuration of a conversion information storage section in the embodiment.

As shown in FIG. 3, a selection table T1, and a plurality of conversion tables T2, T3, T4 etc. correlated to the selection table T1, are stored in the conversion information storage section 571.

The selection table T1 is configured as a table in which is stored a remote controller 72 identification code, which represents operating signal structures independently set according to the manufacturer and the machine model, and a name of the conversion table T2, T3, T4 etc. which corresponds to the identification code.

The conversion table T2 is configured as a table which correlates a received operating signal according to the operating signal structure represented by each identification code, and the specified operating code to be converted by the operating signal conversion section 64.

Returning to FIG. 2, the conversion setting alert section 67 is a part which, in the projector 1 standby condition, when the operating signal processing section 561 of the sub-CPU 56 detects that a specified operating button of the appended remote controller 71 has been depressed by a prescribed operation, informs the operator that a use setting of a new remote controller 72 has become possible by illuminating the LED 62. Specifically, in this example, a "return" button used in a help menu is employed as the specified operating button wherein, on the "return" button being depressed for a certain time, the operating signal processing section 561 judges that a request for the recording of a new remote controller 72 has been made.

3. Operation of Projector 1

Next, a description will be given, with reference to the flowcharts shown in FIGS. 4 to 6, of the operation of the projector 1.

3-1. New Setting of Remote Controller 72

Figure 4:
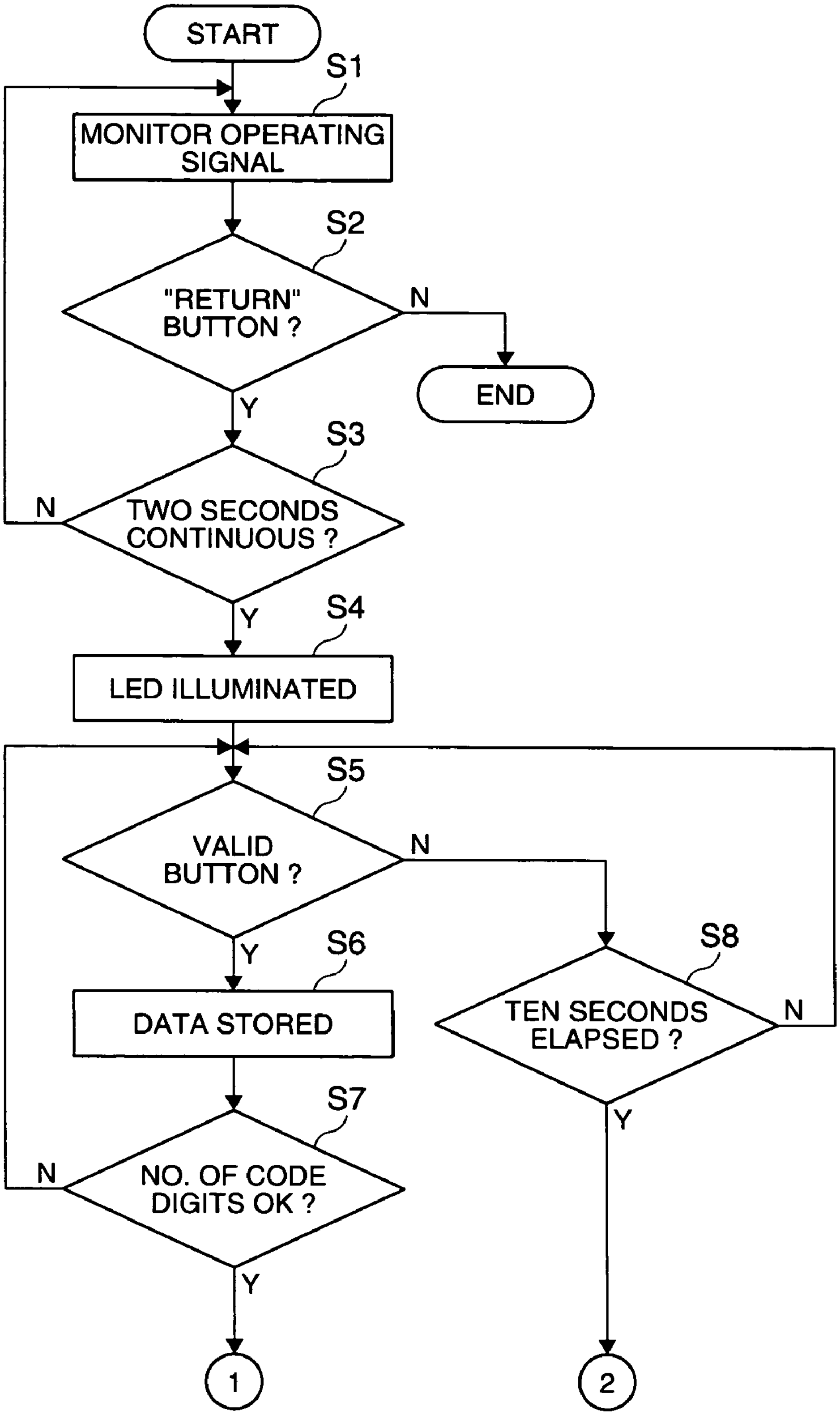
FIG. 4 is a flowchart representing an operation of the electronic instrument according to the embodiment.
Figure 5:
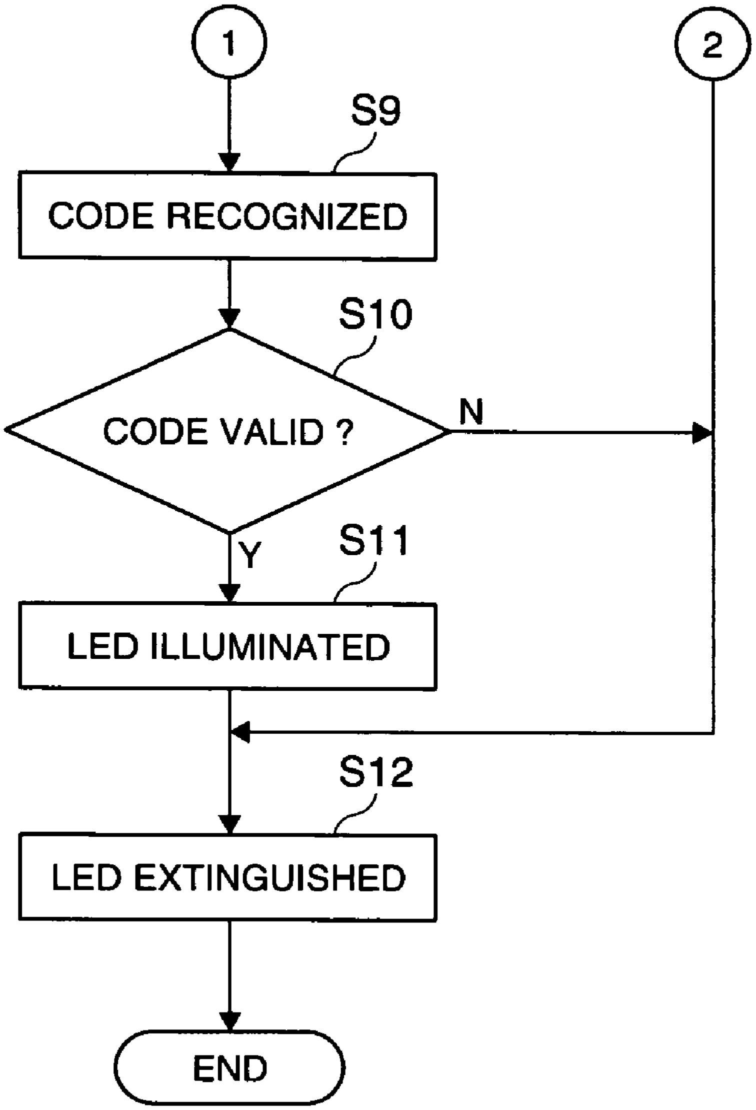
FIG. 5 is a flowchart representing an operation of the electronic instrument according to the embodiment.
Figure 6:
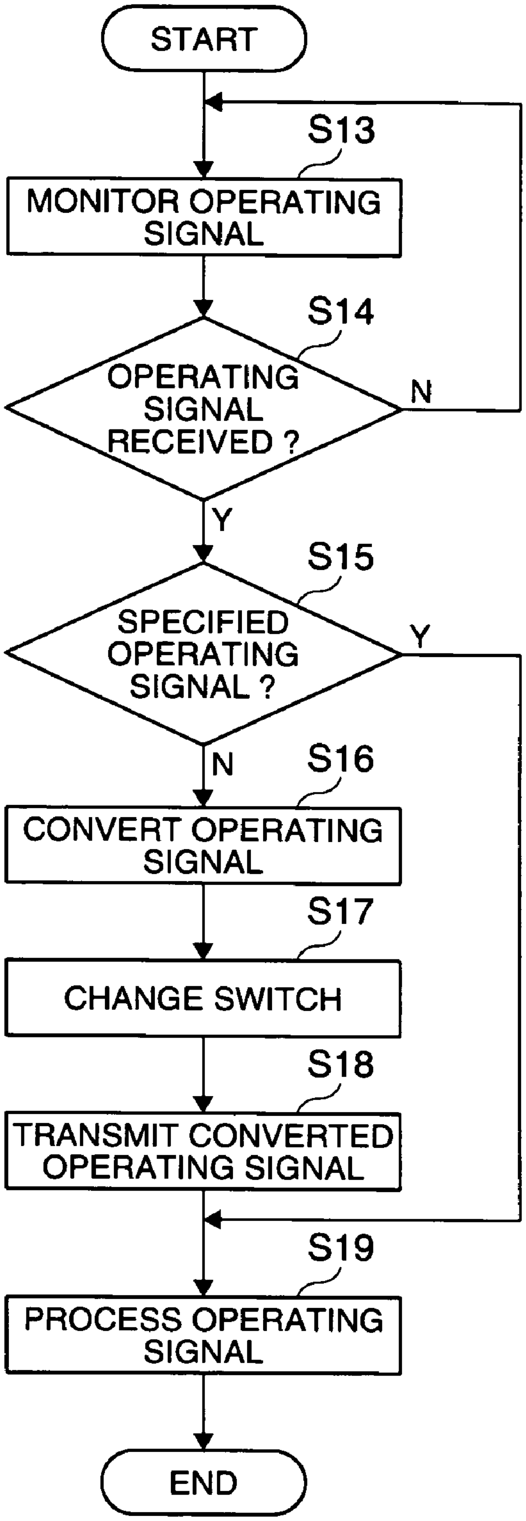
FIG. 6 is a flowchart representing an operation of the electronic instrument according to the embodiment.

In a case of newly setting and recording the remote controller 72 of a different operating signal structure, a process is carried out based on a flowchart shown in FIGS. 4 and 5.

a. In the standby condition of the projector 1, the operating signal processing section 561 of the sub-CPU 56 monitors the remote controllers 71 and 72 operating signals received by the IR receiver 61 (step S1), and determines whether or not the specified operating signal received when the "return" button is pressed has been received from the remote controller 71 (step S2). Even in the event that the operating signal is received from the new remote controller 72 in this condition, as the operating signal structure is different, no processing is carried out by the operating signal processing section 561.

b. If the operating signal processing section 561 determines that the specified operating signal from the remote controller 71 is not the specified operating signal of the "return" button, the operating signal processing section 561 carries out the processing appropriate to the specified operating signal, excluding a series of the processes. In this case, as it is normal that the operator first presses the power button to start up the projector 1, the operating signal processing section 561 of the sub-CPU 56 starts up the CPU 55 by carrying out a start-up process, after which it entrusts the processing of the specified operating signals received by the IR receiver 61 to the operating signal processing section 551 of the CPU 55. Meanwhile, if it is determined that the specified operating signal is the "return" button, the operating signal processing section 561 determines whether or not a continuous depression time of the "return" button is a certain time, for example two continuous seconds (step S3). If the continuous depression time of the "return" button is less than two seconds, the operating signal processing section 561 returns to the operating signal monitoring, and monitors the next operating signal received.

c. If it is determined that the "return" button has been depressed continuously for two seconds or more, the operating signal processing section 561 judges that a request for the recording of the use setting of the new remote controller 72 has been received from the operator and transmits the fact to the decode microcomputer 6, based on which the conversion setting alert section 67 of the decode microcomputer 6 illuminates the LED 62 (step S4).

d. The operating signal structure selection section 66 monitors the contents of the specified operating signal received from the remote controller 71 after the LED 62 have been illuminated, and determines whether or not an operating button of the remote controller 71 which is valid for the setting recording operation has been operated (step S5). As a valid operating button, in a case in which the identification code is arranged in a numerical sequence, as shown in FIG. 3, it is acceptable to set a number button as the valid operating button while, regarding the identification code according to the manufacturer, the machine model and the like, it is acceptable to include a reference table in a manual etc. appended to the projector 1.

e. If it is determined that the valid operating button has been operated, the operating signal structure selection section 66 stores the contents of the specified operating signal corresponding to the operating button in an internal memory provided in the decode microcomputer 6 (step S6), repeating this until the number of digits in the identification code is assembled (step S7).

f. Meanwhile, if it is determined that it is not the valid operating button, the operating signal structure selection section 66 determines whether or not a certain time, for example ten seconds, has elapsed (step S8) whereon, if the certain time has not elapsed, it monitors a further input from the valid operating button. Then, if ten seconds eventually elapse, the operating signal structure selection section 66 determines that the operation is erroneous and causes the conversion setting alert section 67 to extinguish the once-illuminated LED 62 (step S12).

g. In step S7, if it is determined that the prescribed number of identification code digits has been assembled, the operating signal structure selection section 66 carries out a recognition of the identification code (step S9), cross-references the recognized identification code with the identification code stored in the selection table T1 of the conversion information storage section 571, and determines whether or not the recognized identification code is valid (step S10). If it is determined that the recognized identification code is not in the selection table T1, the operating signal structure selection section 66 causes the conversion setting alert section 67 to extinguish the LED 62 (step S12).

h. Meanwhile, if it is determined that the identification code is valid, the operating signal structure selection section 66, as well as illuminating the LED 62 (step S11), calls up the conversion table T2, T3, T4 etc. corresponding to the identification code and, after recording it in the memory of the microcomputer 6, causes the conversion setting alert section 67 to extinguish the LED 62 (step S12), thus alerting to the fact that the recording is complete.

3-2. Operation of Projector 1 by Remote Controllers 71 and 72 during Operation

Next, a description will be given, with reference to the flowchart in FIG. 6, of the operation of the projector 1 by the remote controllers 71 and 72 while the projector 1 is in operation.

a. While the projector 1 is in operation, the operating signals transmitted from either one of the remote controllers 71 and 72 and received by the IR receiver 61 are monitored by the operating signal processing section 551 in the CPU 55 and by the operating signal conversion section 64 in the decode microcomputer 6 (step S13), whereon it is determined whether or not each one has received the operating signal (step S14).

b. When the operating signal is received, the operating signal processing section 551 and the operating signal conversion section 64 determine whether or not the operating signal is the specified operating signal transmitted from the remote controller 71 (step S15). Regarding the judgment in each case, in the operating signal processing section 551, it is carried out by virtue of being unable to decode an operating signal other than the specified operating signal, thus being unable to process the operating signal. Meanwhile, in the operating signal conversion section 64, judgment is carried out due to the fact that, even if the specified operating signal is received, as the received operating signal of the conversion table, from among the conversion tables T2, T3, T4 etc., stored in the internal memory of the decode microcomputer 6 does not correspond to the specified operating signal actually received, the received specified operating signal cannot be converted.

c. If it is determined that the operating signal received is the specified operating signal, the operating signal processing section 551 carries out an operating signal processing based on the specified operating signal, thus executing the various setting processes inside the projector 1 (step S19).

d. Meanwhile, if it is determined that the operating signal received is the operating signal from the recorded remote controller 72, the operating signal conversion section 64 carries out an operating signal conversion based on the conversion table stored in the internal memory (step S16). Along with the operating signal conversion process, the switch control section 65 changes the position of the switch 63 to the branch signal transmission B side (step S17) whereon, when the switch 63 position switching is complete, the operating signal conversion section 64 transmits the operating signal which has been converted into the specified operating signal to the operating signal processing section 551 (step S18), whereon the operating signal processing section 551 executes the various setting processes in the projector 1 based on the converted operating signal (step S19).

4. Modifications of Embodiment

The invention is not limited to the embodiment heretofore described, but also includes the following modifications.

Although, in the embodiment, the invention has been applied to a rear projector, it is not limited hereto, as the invention can also be employed in a slim, large-model television receiver such as a PDA (Plasma Display Panel), an LCD or an organic EL, or in a regular CRT type television receiver. Furthermore, the invention can be employed not only in a television receiver, but also in a recording instrument such as a video, a DVD recorder or an HD recorder, that is to say, the invention can be suitably employed in any electronic instrument which is remotely operated by a remote controller.

In the embodiment, the conversion of the operating signal by the operating signal conversion section 64 is carried out by a table reference format, but the invention is not limited thereto. That is, it is also acceptable to configure in such a way that a received operating signal based on a different operating signal structure is converted into the specified operating signal by carrying out a modulation process such as a pulse width modulation or a frequency modulation.

Apart from these, it is also acceptable to use another configuration etc., within the range of being able to achieve the aim of the invention, as a specific configuration and formation etc. when implementing the invention.

The entire disclosure of Japanese Patent Application No. 2005-197423, filed Jul. 6, 2005 is expressly incorporated by reference herein.

What is claimed is:

1. An electronic instrument for which operating setting is possible according to operating signals transmitted from a plurality of kinds of remote operating devices of a differing operating signal structure, comprising:

an operating signal receiving section which receives the operating signals transmitted by the remote operating devices;

an operating signal processing section which, when a specified operating signal based on a specified operating signal structure is input among the operating signals received by the operating signal receiving section, carries out a process control of the electronic instrument in accordance with the specified operating signal; and an operating signal conversion section which, being provided in a branch signal transmission system which diverges from a direct signal system, which directly transmits the operating signal from the operating signal receiving section to the operating signal processing section, converts an operating signal based on an operating signal structure which differs from the specified operating signal into the specified operating signal;

a conversion information storage section which stores identification information concerning a pre-set plurality of kinds of operating signal structures, and a specified operating signal according to an operating signal based on each of the operating signal structures;

a conversion setting alert section which, when a prescribed, specified operating signal is input among the specified operating signals, alerts to the fact that a conversion setting of an operating signal based on another operating signal structure is possible; and an operating signal structure selection section which, in the event that identification information based on the specified operating signal is received by the operating signal receiving section, selects an operating signal structure corresponding to the identification information received from among the operating signal structures stored in the conversion information storage section, wherein the operating signal conversion section transmits the converted operating signal to the operating signal processing section, whereon the operating signal processing section carries out an operating process in the electronic instrument based on the converted operating signal.

2. An electronic instrument according to claim 1 wherein, the conversion setting alert section, when the conversion setting becomes possible, illuminates a light emitting body provided in the electronic instrument, and causes the light emitting body to flash when the selection operation is complete.

3. An electronic instrument according to claim 2, including:

a transmission system switching section, which switches an input of an operating signal from the direct signal transmission system or the branch signal transmission system to the operating signal processing section; and a switch control section which, when the conversion of the operating signal is carried out by the operating signal conversion section, switches the transmission system switching section to the branch signal transmission system.

4. An electronic instrument according to claim 1, including:

a transmission system switching section, which switches an input of an operating signal from the direct signal transmission system or the branch signal transmission system to the operating signal processing section; and a switch control section which, when the conversion of the operating signal is carried out by the operating signal conversion section, switches the transmission system switching section to the branch signal transmission system.

* * * * *